Feb. 19, 1929.
N. A. NEWDICK
LOADING MACHINE
Filed Dec. 11, 1922
1,702,519
6 Sheets-Sheet 1
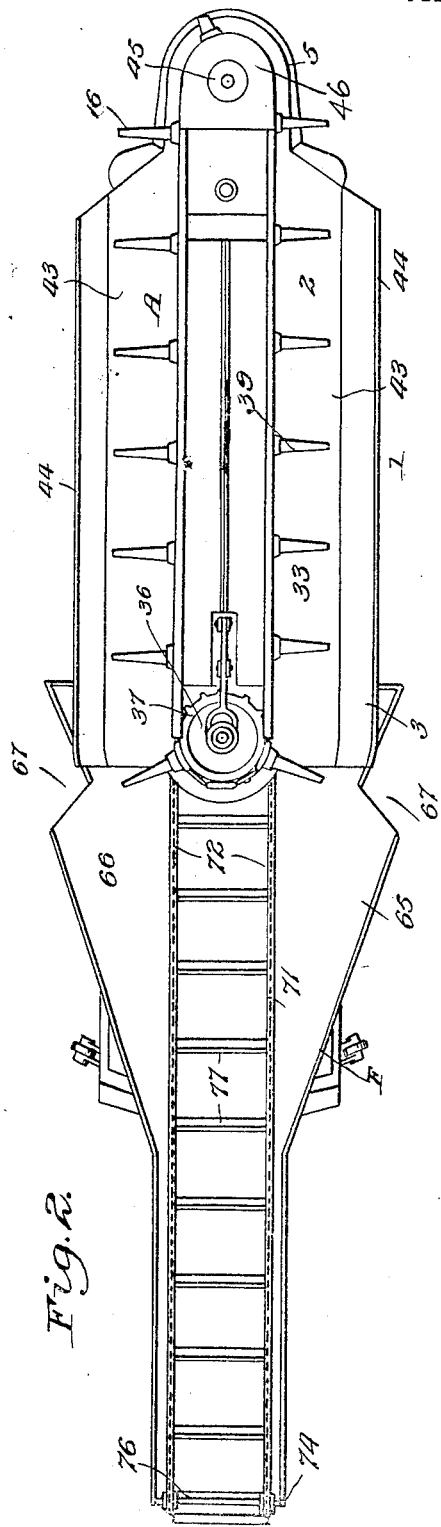
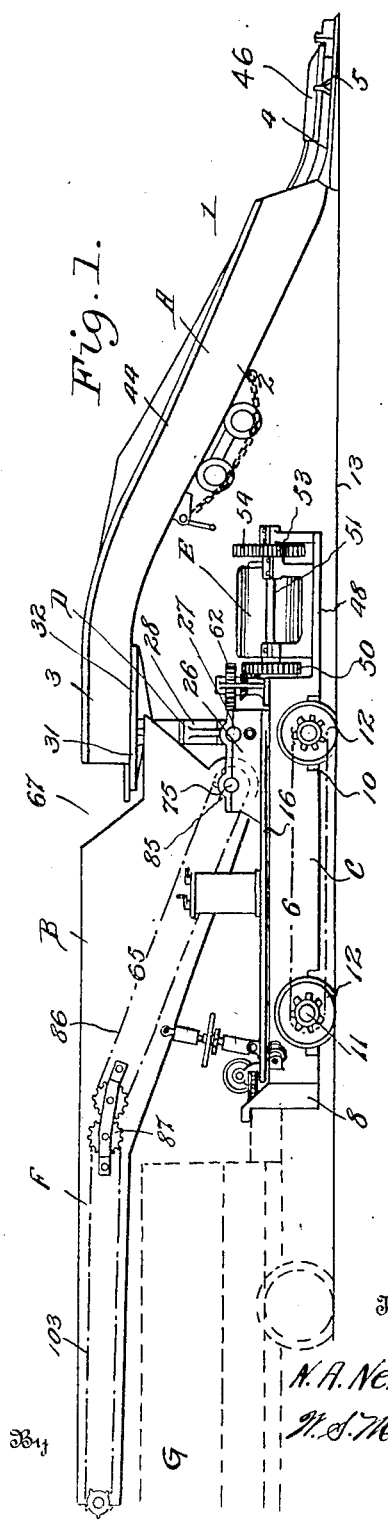

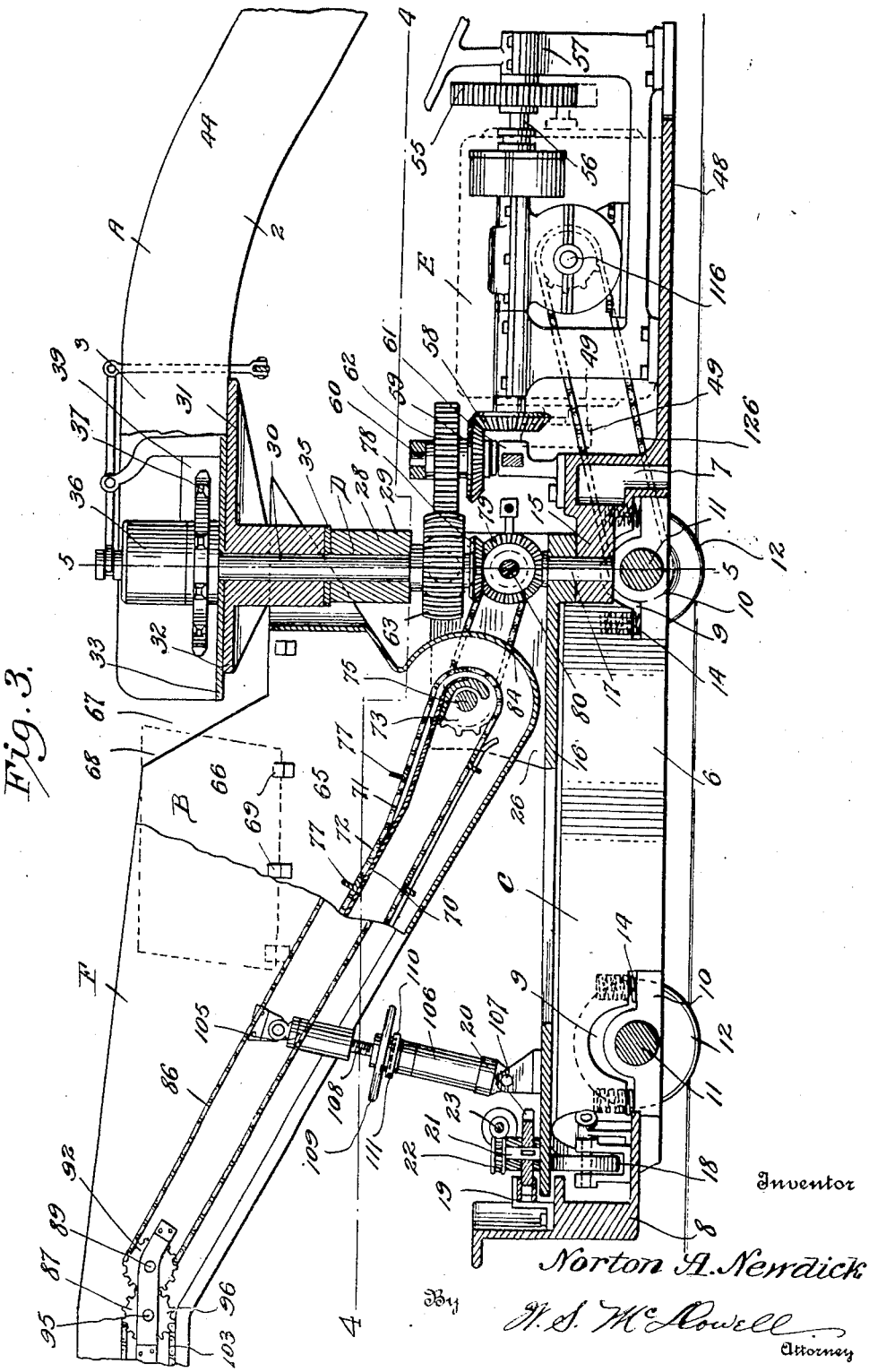

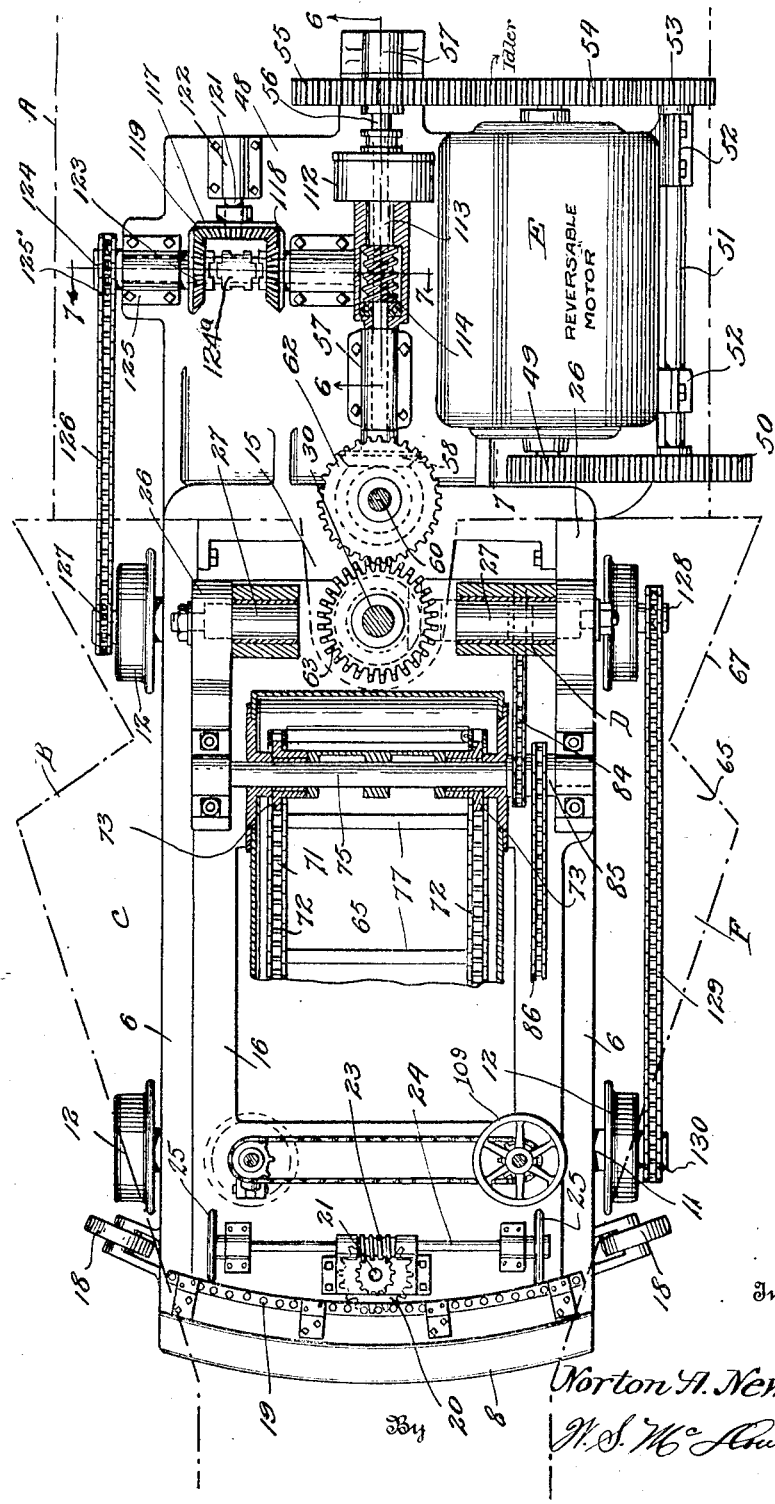

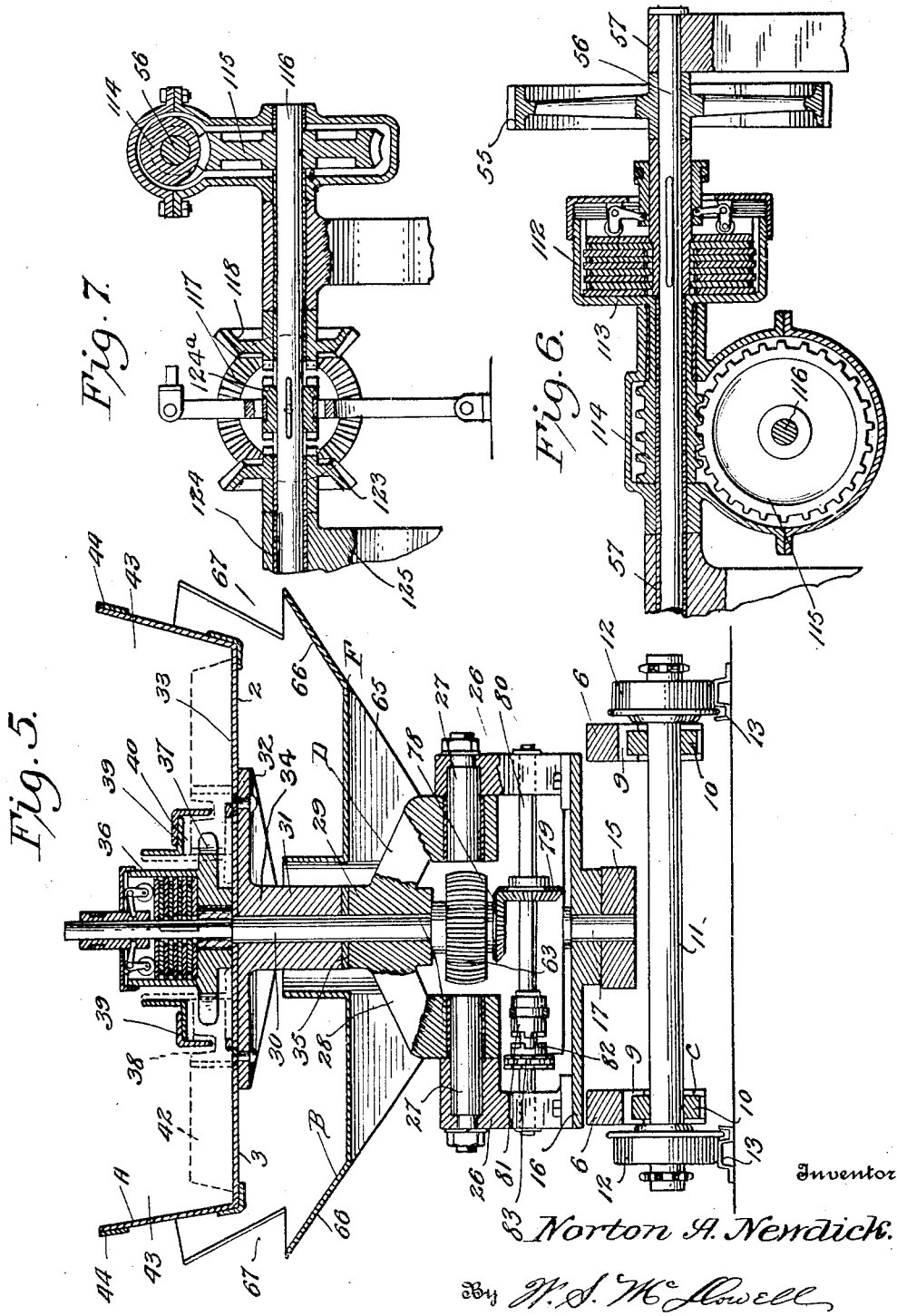

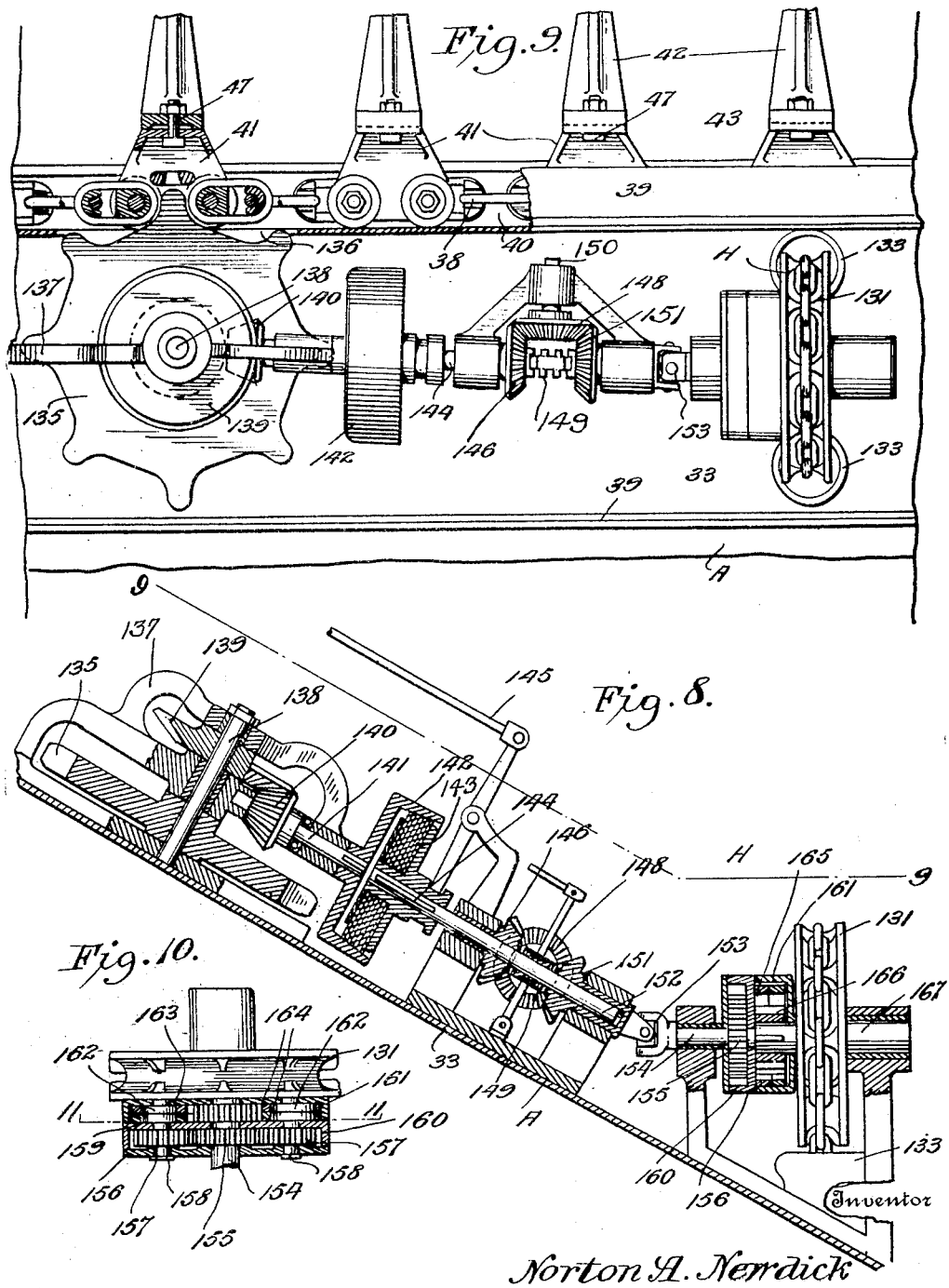

Feb. 19, 1929.  
N. A. NEWDICK  
LOADING MACHINE  
Filed Dec. 11, 1922

Inventor  
Norton A. Newdick

Patented Feb. 19, 1929.

1,702,519

UNITED STATES PATENT OFFICE.

NORTON A. NEWDICK, OF COLUMBUS, OHIO, ASSIGNOR TO THE COLODER COMPANY, OF COLUMBUS, OHIO, A CORPORATION OF DELAWARE.

LOADING MACHINE.

Application filed December 11, 1922. Serial No. 606,235.

This invention relates to improvements in loading machines, and is especially directed to loading machines adapted for employment in underground coal mines for the purpose of mechanically transferring coal, after the latter has been broken down in a loose, semi-solid or shattered state from the original solid vein or bed, into mine or pit cars for transportation out of the mine.

The primary object of the invention resides in the provision of a loading machine of the above character constructed to provide mechanical means for economically and rapidly loading coal into suitable carriers with but a minimum of manual operations.

Another object of the invention resides in the provision of a machine which will constitute an improvement upon the structure of the machine disclosed in my co-pending application, Serial No. 439,092, filed January 22, 1921, by providing an improved driving arrangement for the conveyer units disclosed in said application.

The principles of the invention are found in the provision of a loading machine which is formed to comprise progressively arranged gathering and delivering conveyers, the gathering conveyer being formed to include a conveyer belt having its going and return sections disposed at the same elevation and mounted for movement upon an elongated inclined frame, which has its rear or elevated end mounted upon a supporting structure which includes vertical and horizontal axes, located to permit the gathering conveyer to swing bodily in both horizontal and vertical planes, so that the front end thereof may be maintained in engagement with the material to be gathered and loaded, the delivering conveyer being formed to comprise a frame which includes a hopper, situated at all times beneath the discharge end of the gathering conveyer, and wherein the said delivering conveyer further includes a conveying belt which has its going and return runs located in different planes, the upper run of the delivering conveyer belt being arranged to pass over and out of the bottom of the hopper to remove materials from said hopper and deliver the same into suitable independent carriers placed beneath the rear elevated end of the loading or delivering conveyer. This arrangement of conveyers has been disclosed and claimed in my Re-issue Patent No. 15,339, issued April 18, 1922.

A further object of the invention rests in providing a single motor which is employed for the purpose of driving the conveying belts of the gathering and delivering conveyers, to effect the propulsion of the machine and to operate the mechanism for positively effecting bodily lateral swinging movement on the part of the gathering conveyer in lieu of employing a plurality of motors for effecting these different operations.

A still further object of the invention resides in forming the driving mechanism to include a reversible motor driving directly to the belt of the gathering conveyer, whereby upon the reversal of the direction of rotation of the motor, the direction of movement of the gathering conveyer belt may be controlled at will, there being a drive connection from said motor to the belt of the delivering conveyer, which includes an automatic reversing mechanism arranged and constructed to operate the belt of the delivering conveyer in but one direction, i. e. the draft direction, irrespective of the direction of rotation of the motor, the said motor being further connected with the supporting base of the machine upon which the conveyers are mounted, in order that motion may be imparted to the machine to move the same from place to place, independently of or conjointly with the operation of said conveyer belts.

A still further object of the invention rests in the provision of an improved mechanism for effecting the side swinging of the gathering conveyer, in which said side swinging mechanism is driven directly from the belt of the gathering conveyer, wherein mechanism is included for controlling the direction of movement of said side swinging mechanism independently of the direction of movement of the gathering conveyer belt.

With these and other objects in view, as will appear as the description proceeds, the invention consists in the novel features of construction, combinations of elements and arrangements of parts, hereinafter fully described and pointed out in the appended claims.

In the accompanying drawings forming a part of this specification, and in which similar characters of reference denote like and corresponding parts throughout the several views:

Figure 1 is a side elevation of a loading machine constructed in accordance with the principles of the present invention.

Figure 2 is a plan view of the machine.

Figure 3 is an enlarged vertical sectional view taken through the supporting structure, its propelling mechanism, the rear end of the gathering conveyer and the forward end of the loading or delivering conveyer.

Figure 4 is a horizontal sectional view taken on the plane indicated by the line 4—4 of Figure 3.

Figure 5 is a vertical transverse sectional view taken on the plane indicated by the line 5—5 of Figure 3.

Figure 6 is a longitudinal sectional view taken on the plane disclosed by the line 6—6 of Figure 4 and disclosing more particularly the clutch mechanism and associated gearing employed in the propelling of the supporting truck of the machine.

Figure 7 is a detail sectional view on the line 7—7 of Figure 4.

Figure 8 is a vertical sectional view, disclosing the mechanism for effecting side swinging movement of the gathering conveyer and the drive therefor.

Figure 9 is a horizontal sectional view taken on the plane indicated by the line 9—9 of Figure 8, the clutch operating levers and the lever supporting bracket being omitted for the sake of clearness.

Figure 10 is a sectional view taken through the eccentric drive means for the pocket sheave of the side swinging mechanism of the gathering conveyer.

Figure 11:
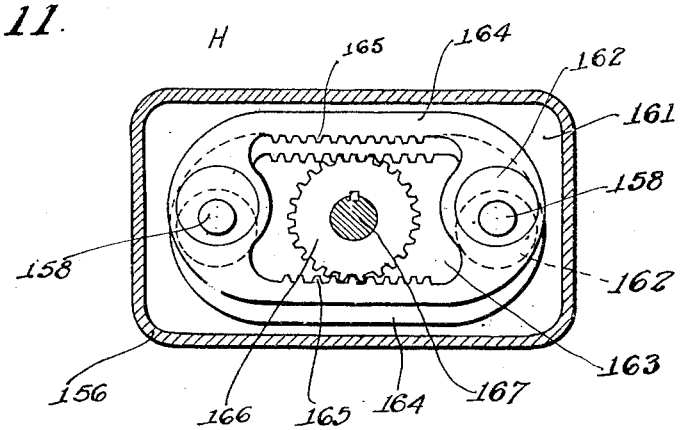
Figure 11 is a detail sectional view taken along the plane indicated by the line 11—11 of Figure 10.

Referring more particularly to the specific form of the invention disclosed in the accompanying drawings, the numeral 1 designates my improved loading machine in its entirety. Essentially, the machine consists of a gathering conveyer A and a loading or delivering conveyer B, the said conveyers being progressively mounted upon a suitable portable supporting base C, which in this instance is in the form of a wheeled truck, the arrangement of the conveyers being such that the gathering conveyer will discharge its material into the delivering conveyer, which latter is so constructed and mounted that the same may advance material toward and discharge the same into mine or pit cars placed to the rear of the machine at any suitable angular position which the same may be located with respect to the gathering conveyer. I have found it advisable to employ a pair of conveyers, in lieu of the single conveyer construction, because of the fact that in the majority of modern coal mines, most of the work of loading coal is performed in curved or tortuous passageways, therefore it is essential that the conveying means of the machine be sufficiently flexible to enable the machine to possess the requisite gathering reach or range and at the same time to control the discharge of the materials gathered thereby into the relatively inaccessibly disposed mine cars of the type used in coal mines generally. While the employment of two conveyers is preferable, nevertheless, it will be appreciated that where mining conditions permit, the machine may be constructed to include but one conveyer, to-wit, a gathering conveyer.

The gathering conveyer includes an elongated inclined frame 2 which is formed in this instance from structural steel and, as shown in Figure 1, includes an elevated rear end 3, disposed substantially in a horizontal plane, and at the front or lower end, the frame includes a flat depressed nose end 4, having a beveled periphery 5 which is adapted for engagement with the floor of a mine, and by suitable mechanism to be hereinafter described, the said nose end of the machine is adapted to pass beneath and into engagement with the materials to be gathered.

To effect the support of the gathering conveyer, the base C is provided. This base is in the form of a wheeled truck and includes longitudinal extending side members 6 which are united at their ends by means of a front end frame 7 and a rear end frame 8, the members 6, 7 and 8 being securely united to produce a rigid strong rectangular structure. The side members 6 are formed with pockets 9, in which are positioned for vertical movement the journal boxes 10 of a pair of wheel axles 11, the outer ends of said axles having suitably keyed thereon track engaging wheels 12, suitably gauged in accordance with the width of the trackway 13 over which the machine operates. The journal boxes 10 are resiliently spaced from the side members 6 by means of strong coil springs 14 which assist in maintaining the wheels 12 on the roof or uneven tracks found in a coal mine and in relieving the machine generally of shocks and jars incident to its transportation from place to place within a mine.

The front end frame 7 includes an inwardly extending ear 15 upon which rests the forward end of a shiftable bed plate 16, a pin 17 being disposed to pass vertically through aligning openings provided in the forward end of the bed plate 16 and the ear 15, and about which pin the bed plate swings in a horizontal plane. The rear end of the bed plate is mounted upon anti-friction rollers 18 suitably carried upon the rear end frame 8 of the truck, and it will be observed that the rollers 18 are disposed so that the same will engage with the under surface of the bed plate, a feature which prevents loose coal or other material from interfering with the action of the rollers. For example, if the rollers 18 are carried so as to depend from the bed plate 16 and engage with the end frame, accumulated coal deposit would seriously interfere with their operation, however, by the arrangement shown, this difficulty is obviated and a structure provided by means of which the bed plate and the mechanism supported thereon may be conveniently oscillated in a horizontal plane.

To effect this oscillation of the bed plate 16, I provide the end frame 8 with an arcuate rack 19 and the bed plate with a sprocket 20 disposed in engagement with said rack and mounted upon a suitably journaled shaft 21. This shaft has its upper end equipped with a worm gear 22 arranged to mesh with a worm 23 mounted upon the intermediate portion of a shaft 24, which is journaled in connection with the bed plate and has the ends thereof equipped with hand wheels 25 by means of which the shaft 24 may be manually rotated. Obviously, upon the rotation of the shaft 24, motion will be imparted to the sprocket 20 to cause the shifting of the bedplate to any desired extent, and by reason of the worm gearing an automatic lock is provided for maintaining the bed plate in any of its adjusted positions.

Disposed upon the forward end of the bed plate 16 is a pair of bearings 26 with which are connected studs 27 arranged to project horizontally over the bed plate. Trunnioned upon these studs is the lower end of the supporting structure D of the gathering conveyer, which structure in this instance comprises a yoke shaped casting 28 having the lower bifurcated end thereof suitable mounted upon the studs 27 to rock in a vertical plane with the axis of said studs as a center. Arranged to pass through the hub portion 29 of the casting is a drive shaft 30 for the gathering conveyer, and positioned around this shaft and mounted upon the upper end of the hub 29 is the pivot flange casting 31 of the gathering conveyer. The enlarged flange 32 of this casting is riveted or otherwise secured to the bottom plate 33 of the frame 2, and the hub 34 of the casting 31 has its lower end mounted upon a metallic wear receiving washer 35, which is positioned around the shaft 30 and disposed upon the upper end of the hub 29. It will be seen that by this construction, the gathering conveyer frame will be so supported that the same may swing about the vertical axis provided by the shaft 30, in order that the forward or nose end of the frame may oscillate horizontally across a mine floor in advance of the truck C, and furthermore, said frame will be permitted to follow the contour of the mine floor by means of the horizontal pivot provided by the studs 27 and associated parts. A compound pivotal structure is therefore provided for the gathering conveyer. However, when the gathering conveyer frame is swung to assume extreme angular positions with respect to the longitudinal center line of the machine, or positions in which the studs 27 are not completely effective in permitting of vertical oscillation of the frame 2, the springs 14 in the journal boxes of the truck permit the machine to oscillate bodily a sufficient extent to avoid breakage or strains of parts connected with the gathering conveyer.

Mounted upon the upper end of the shaft 30 is a disk clutch 36, the driven member of which being formed to include a sprocket 37, which constitutes the driving sprocket of the endless conveying belt 38 of the gathering conveyer. This belt, in the present instance, is of the link or chain variety, strongly constructed and flexible in vertical and horizontal planes to readily follow the contour of the bottom plate of the frame 2, the going and return runs of said belt being disposed at similar elevations, or in other words, the belt is of the type commonly referred to as the single planetype, and the specific construction thereof has been disclosed in Figure 9, although this belt is not claimed per se in this application. Angle irons 39 are mounted upon the bottom plate 33 and are formed to comprise guides 40, which extend longitudinally of the frame 2 and are transversely spaced to enclose the opposite runs of the belt and protect the links thereof from the clogging action of loose coal. The belt is also constructed to include as a unitary portion thereof a plurality of appropriately spaced flight anchors 41, to which are bolted laterally and horizontally extending flights 42, disposed to travel alternately in a pair of runways 43 provided in the frame 2 between the guides 40 and the sides 44 of the frame. At the forward or lower end of the frame, there is provided a longitudinally adjustable nose sprocket 45, around which the belt 38 is trained, the said sprocket 45 being suitably enclosed by means of a removable housing 46, beyond the periphery of which project the flights 42, the said flights also being of sufficient length to project beyond the beveled periphery 5 of the nose end of the frame 2. It will be seen by this construction that when the clutch 36 is thrown in, motion will be imparted to the drive sprocket 37, which imparts movement to the gathering conveyer belt as a whole, causing the spaced flights 42 to pass longitudinally through the runways 43, and that these runways are alternately available to pass coal therethrough in a draft direction in accordance with the direction of rotation of the sprocket 37. It will be observed that the flights as they pass around the nose sprocket 45 of the machine will be brought into contact with the material to be gathered, engaging such material and drawing the same upwardly through either one or the other of the runways 43. The flights have a digging or scouring action which removes partially shattered coal, as well as the loose coal, and that by reason of the endless belt, the gathering action is substantially continuous, instead of intermittent as is the case in loading machines of the scoop or shovel type. It is for this reason essentially that the present machine possesses a high capacity for coal loading. The gathering chain or belt construction is exceptionally staunch and is not likely to break under conditions of actual loading. The links of the belt are protected by connecting the flights 42 with the anchors 41 by frangible bolts 47, which when the belt is unduly stressed, it will break or snap off, preventing injury to the driving mechanism of the conveyer or the latter itself. Moreover, the disk clutch 36 is also effective in preventing breakage of the chain, in that the said clutch may be set to slip under predetermined loads. The said clutch 36 may be either of the permanently set type, or may be manually actuated. I prefer the latter construction, although both forms are adaptable.

To drive the gathering conveyer, I form the front end frame with an integral forwardly projecting shelf 48 suitably ribbed and reinforced to stand the weight of mechanism imposed thereon. This shelf protrudes in advance of the machine to receive a suitable motor E which in this instance, is of the electrical type, although an air motor may be substituted in lieu thereof when the machine is used in gaseous mines. It will be understood that the motor may be of any desired horse power. In this instance, the motor is of 46 H. P. and its armature shaft rotates at substantially 525 R. P. M. but it will be understood that these specifications are not strictly essential but are merely given for illustrative purposes. Upon the armature shaft of the motor, there is mounted a drive pinion 49, which meshes with the gear 50 provided upon a back gear shaft 51 suitably journaled in bearings 52 carried by the frame of the motor. To further reduce the speed of the motor, to render the same suitable for driving the relatively slowly moving gathering conveyer, the front end of the shaft 51 is provided with a pinion 53 meshing with an idler gear 54 loosely journaled for rotation upon the forward end of the motor, and the gear 54 in turn meshes with a gear 55 keyed or otherwise secured to the longitudinally extending shaft 56 journaled in bearings 57 carried by the shelf 48, see Figure 6. The rear end of the shaft 56, as shown in Figure 3, is formed with a miter gear 58 meshing with a similar gear 59 provided upon a short vertical shaft section 60, which is carried in a bearing 61 mounted upon the front end frame 7 of the truck. The shaft 60 carries a spur gear 62 which meshes with a gear 63 mounted upon the lower end of the drive shaft 30 of the gathering conveyer. Therefore, it will be seen that the gathering conveyer is directly connected with the motor E which is of a reversible type so that the direction of the movement of the gathering conveyer may be governed by the operation of the controller 64 for said motor. Moreover, by the gearing disclosed, the speed of the motor is reduced so that the drive shaft 30 will revolve at the proper speed. Because of the vertical oscillation of the frame 2 and associated supporting structure D, it is necessary that either the gears 62 or 63 be formed to include teeth having arcuate outer edges. In this instance, the gear 63 has been so formed, and it will be noted that the gear 63 is located in alignment with the horizontal axis of the supporting structure, to-wit, the studs 27, or in other words at a point wherein its degree of oscillation is at a minimum. By forming the gear 63 as illustrated, driving engagement between the gears 62 and 63 is maintained throughout all positions of vertical and horizontal oscillation of the gathering conveyer and the structure is provided for imparting motion from the stationary driving mechanism of the motor E to the movable mechanism of the gathering conveyer.

The delivering conveyer includes a frame F which has its forward end formed to include a hopper 65, shaped to be constantly beneath the discharge end of the gathering conveyer. This hopper includes flaring side walls 66, which have their forward corners cut away as at 67 to prevent the walls 66 from interfering with the side swinging movement of the gathering conveyer frame. These cutaway portions may be closed by means of movable side plates 68, which are slidably mounted so as to be moved from active to inactive positions with respect to the forward end of the hopper. Cleats 69 may be employed for slidably supporting the side plates. It will be understood that it is necessary for the side walls 66 to project in a horizontal plane on one side of the hopper at least above the plane of the delivering end of the gathering conveyer belt. Because of the fact that the flights 42 of the gathering conveyer belt travel at considerable speed when passing around the sprocket 37 and by centrifugal forces therefore set up, the coal to a certain extent is flung toward the side walls of the hopper with very considerable force. To avoid spillage of this coal, the elevated sides are necessary. It will be understood that but one of the side plates 68 may occupy a closed position at a time and the plate in active position will depend upon the direction of movement of the gathering conveyer belt. The frame F includes a bottom 70, which is inclined at its front end to constitute the bottom of the hopper 65, the extreme lower end of said bottom being appropriately spaced from the elevated end of the bottom plate 33 to allow large lumps of coal to be deposited within said hopper so as to avoid interference with the revolving horizontally traveling flights of the gathering conveyer. In the event, however, that the hopper should become filled with coal to such an extent as to interfere with the movement of the flights, relief will be afforded automatically or manually by the clutch 36, however, for ordinary purposes, the hopper is of sufficient depth to preclude such interference. A conveyer belt 71 is provided in the frame F and is of a type wherein the going and return sections are in different planes. In this instance, the belt 71 includes a pair of longitudinally extending transversely spaced endless chains 72 of the link variety, which are adapted to pass over sprockets 73 at the forward end of the hopper and over similar sprockets 74 at the extreme rear end of the frame F. The sprockets 73 are loosely mounted for rotation upon the transversely extending shaft 75 which has its ends mounted within the bearings 26 on the bed plate 16, whereas the sprockets 74 are fixed upon a drive shaft 76 disposed at the extreme rear end of the frame F. The chains 72 are united by longitudinally spaced transversely extending flights 77, which travel over the bottom 70 of the hopper and are adapted to move coal in a draft direction through the loading conveyer frame F. These flights are of sufficient height to securely engage with the coal and move the same up the forward inclined portion of the bottom 70 and to finally discharge the coal from the rear elevated end of the frame F into an underlying mine car, designated by the letter G. The drive shaft 76 is placed at the rear of the frame instead of at the forward end thereof in order that the chain may pull the coal instead of pushing it. This construction makes for better chain operation and engagement between the rollers of the chain and the sprockets.

To drive the delivering conveyer, the lower end of the shaft 30 is formed with a beveled gear 78, meshing with a similar gear 79 provided upon a transversely extending shaft 80 journaled in the bearings 26 beneath the shaft 75. The shaft 80 is provided with a feathered clutch 81, disposed for engagement with a clutch hub 82 provided upon a sprocket 83 loosely mounted on the shaft 80. For convenience in illustration, I have disclosed a jaw type of clutch, but it will be understood that any other suitable form of clutch may be employed if found desirable. The sprocket 83 has trained thereover a chain 84, which leads to the double sprocket 85, loosely mounted upon one end of the shaft 75, and from the sprocket 85 an endless chain 86 leads back to the automatically reversing mechanism 87. This mechanism is disclosed in my aforesaid application and is therefore not claimed per se in this application. However, to effect a complete disclosure, the same has been illustrated herein and described, the office thereof being to provide a drive for the delivering conveyer which will operate the latter in but one direction only irrespective of the direction of movement of the gathering conveyer. This condition is necessitated when it is understood that the gathering conveyer must be reversed when in operation so as to gather material when moved in one direction or the other about its vertical axis, but it is essential that the delivering conveyer shall move in but one direction, to-wit, a draft direction, and since both conveyers are driven from a single reversible motor, I find the reversing mechanism desirable.

It is of course possible that this mechanism could be operated by hand, but by rendering the same automatic, a detail in the operation of the machine is removed from the mind of the operator or runner.

Figure 12:
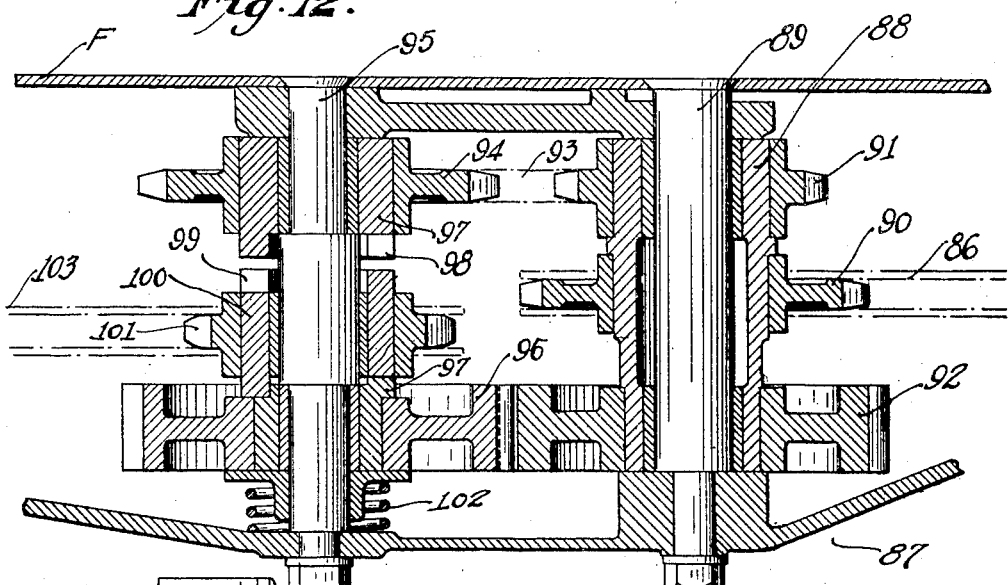
Figure 12 is a horizontal sectional view taken through the automatic reversing clutch drive of the belt of the loading conveyer, and, Figure 13 is a plan view thereof.
Figure 13:
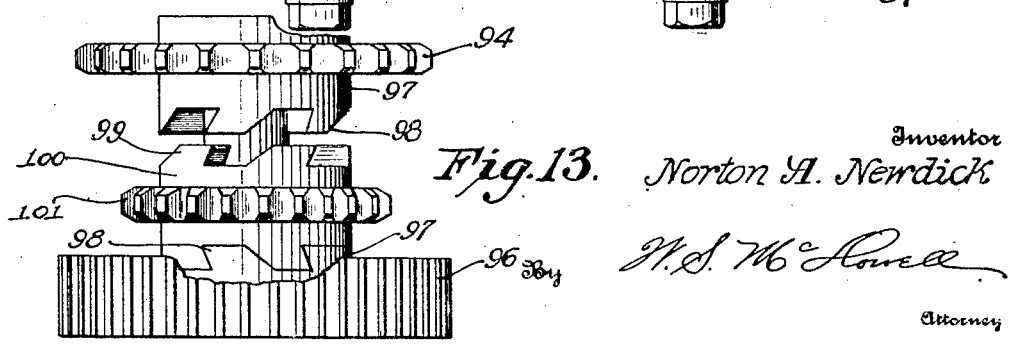

The reversing mechanism has been disclosed in Figures 12 and 13 and as shown, includes a sleeve 88 loosely mounted for rotation upon a fixed stud shaft 89. The sleeve is provided with a sprocket 90 over which the chain 86 is trained. Fixed upon the sleeve and rotatable in unison with the sprocket 90 is a second sprocket 91 and a gear 92, the sprocket 91 having trained thereover a short chain section 93, which leads to the sprocket 94 loosely mounted for rotation upon a stud shaft 95. Similarly, the gear 92 is in mesh with a gear 96 loosely mounted upon the shaft 95. The sprocket 94 and the gear 96 are formed with clutch hubs 97 having reversely disposed clutch teeth 98 formed therein, which teeth are adapted for alternate engagement with similarly formed teeth 99 provided upon a hub 100 of a floating sprocket 101. By this construction, it will be seen that when the primary sprocket 90 is revolving in a clock-wise direction, motion will be imparted to both the sprocket 94 and the gear 96, but the latter elements will rotate in opposite directions, and since the sprocket 94 will be moving in a clock-wise direction, the angularity of the teeth upon the hub thereof will cause the floating sprocket 101 to be shifted upon the shaft 95 so that the said floating sprocket will be clutched with the teeth of the gear 96. Conversely, when the sprocket 90 is driven in a counter-clock-wise direction, the floating sprocket will be automatically shifted into engagement with the teeth of the sprocket 94, and therefore the direction of rotation of the floating sprocket will be maintained constant, irrespective of the reversal of movement of the main operating motor E. A relief spring 102 may be provided to permit of slight relative separation of the sprocket 94 and the gear 96 when the outer tips of the clutch teeth provided upon the hub of the floating sprocket meet with the outer tips of the teeth provided on the hubs of the sprocket 94 and the gear 96. Over the floating sprocket 101 an endless chain 103 is trained, the said chain being also passed around a sprocket 104 provided upon the drive shaft 76 of the delivering conveyer.

It will be observed that the delivering conveyer by being mounted directly upon the bed plate is adapted to be swung horizontally, and vertical adjustment thereof may also be effected by rocking the frame F about the horizontal axis afforded by the shaft 75. This end may be secured by providing the frame F intermediate of its length and on opposite sides thereof with pivoted sleeves 105, disposed in alignment with similar sleeves 106 pivoted as at 107 on the bed plate 16. The sleeves 105 and 106 are provided with reversely threaded bores for the reception of right and left handed screws 108, which are provided centrally with hand wheels 109, sprockets 110 and a connecting chain 111. By this construction, the frame may be raised and lowered from either side of the machine and by reason of the screw construction, the said frame may be maintained in any of its adjusted positions. By driving from the shaft 80 to the shaft 75, motion may be imparted to the belt of the delivering conveyer without interfering with its vertical adjustment. Also, by inclusion of the clutch 81 independent control of the delivering conveyer is secured.

In order to provide for a powerful advance of the gathering conveyer into engagement with the loose coal to be gathered or to effect what is known in the art as a "sump" feed, I provide the shaft 56 with a disk or other type clutch 112, to the driven member 113 of which is secured a worm 114, which meshes with a worm gear 115 suitably encased and arranged to rotate with a transversely extending shaft 116, the latter being employed to drive a reversing gear structure 117. In this instance, the gear structure 117 comprises bevel gears 118 and 123 loosely mounted upon the shaft 116 and meshing with a beveled gear 119 fixed on a rotary shaft 121 supported in a bearing 122 on the shelf 48 of the truck frame. The beveled gear 123 is fixed on one end of a sleeve 124, which has fixed on its other end a sprocket 125'. 124ª designates a shiftable clutch sleeve having a splined connection with the shaft 116 and adapted to connect said shaft with either the beveled gear 118 or beveled gear 123. Trained over the sprocket 125' is a heavy roller chain 126, which leads to a sprocket 127 provided upon one end of the forwardly disposed axle 11. The other end of the forward axle 11 is provided with a second sprocket 128, over which is passed a heavy roller chain 129 corresponding to the chain 126, the chain 129 extending to the sprocket 130 keyed upon the rear axle 11. By this construction, power will be imparted to both sets of wheels of the truck, to secure the maximum tractive effort available. It will be seen that by the inclusion of the clutch 112, rotation of the shaft 116 may be discontinued even during the operation of the motor E, which will allow the reversing gear mechanism to be started manually in accordance with the direction of movement in which it is desired that the machine shall move, after which selection the clutch is again thrown in and the machine operated over a trackway to the desired extent. When the propelling mechanism is not in use, the clutch 112 is thrown out, but the worm gear drive is so situated with respect thereto that the wheels of the truck will be locked in any position, whether the clutch is in or out, a feature which is of prime importance in preventing movement of the machine on its trackway when engaged in loading operations.

To impart a positive side swinging motion to the gathering conveyer so that the latter may turn about the vertical axis provided by the shaft 30 and to sweep from one side of a mine room to the other, so as to gather coal across the full width of such a room, I provide a side swinging mechanism designated generally by the letter H. This mechanism is mounted directly upon the frame 2 of the gathering conveyer and is disposed between the angles 39 so as to be within the confines of the gathering conveyer belt. Another feature in the present invention is the provision of means whereby the side swinging mechanism is operated from power taken directly from the gathering conveyer belt, instead of being operated by a separate motor. The side swinging mechanism comprises essentially a grooved wheel element 131 which in the present instance is in the form of a pocket sheave of the type found upon chain hoists and analogous structures. The wheel element 131 is mounted for rotation about a substantially horizontal axis or is disposed for rotation in a vertical plane and trained thereover is the intermediate portion of a flexible cable, in this instance in the form of an ordinary anchor chain, the said chain being of suitable length so as to extend substantially across the width of a mine room, entry or other passage. The chain is adapted to be positioned within the pockets of the wheel element so that upon the rotation of the wheel element, the gathering conveyer frame will be caused to travel horizontally. This result is secured by passing the intermediate portion of the chain through fixed hawse guides 133 and securing its ends in any suitable way laterally of the machine contiguous to opposite sides of a room. With the ends of the chain 132 thus held, it is obvious that when the wheel element rotates, the gathering conveyer frame may be positively drawn from one side of the room to the other, swinging about the vertical axis of the shaft 30. The present invention includes mechanism whereby the wheel element is driven from the chain and its direction of rotation reversed independently of the direction of movement of said belt.

To secure these results, use is made of a sprocket 135, shown in Figures 8 and 9. This sprocket is mounted intermediately of the frame 2 upon the inclined portion thereof and is disposed in parallelism with the bottom plate 33 of the frame between the angles 39. The teeth of the sprocket 135 are so cut or formed that the same will project through a slot 136, provided in at least one of the angles 39, in order that said teeth may mesh or engage with the links provided in the belt 38. Thus, upon the movement of the gathering conveyer, motion will be imparted to the sprocket.

Surrounding the sprocket is a bearing structure 137, which receives for rotation a shaft 138, fixed to rotate with said sprocket and forming the axis thereof. Also rotatable with the shaft 138 is a beveled gear 139 arranged to mesh with and disposed above a pinion 140, this arrangement being found to be preferable in order to prevent loose coal from interfering with the toothed action of the gears 139 and 140.

Mounted for rotation within the bearing structure 137 is a longitudinally extending shaft 141, upon one end of which is mounted the pinion 140, the other end of said shaft having keyed or fixed thereto the outer section 142 of a cone clutch. The driven or inner section 143 of said clutch is feathered upon a longitudinally extending shaft 144, journaled for rotation in alignment with the shaft 141 and formed to rotate with said shaft when the clutch is thrown in, which may be accomplished by the manual controls 145.

Upon the shaft 144 are loosely mounted gears 146 and 151 of a reversing mechanism, said gears meshing with a gear 148 fixed on a suitably supported stud shaft 150. 149 designates a shiftable clutch sleeve adapted to couple the shaft 144 with either gear 146 or gear 151, the latter gear being fixed to a sleeve 152. By throwing the clutch section 143 out of engagement with the driving section 142, it will be understood that the reversing gear mechanism may be set so that when the clutch is again thrown in, the direction of rotation of the sleeve 152 may be governed at will, and consequently the direction of rotation of the wheel element 131 accordingly controlled in a manner independent of the movement of the gathering conveyer belt.

The lower end of the sleeve 152 is connected with a universal joint 153 with a horizontally extending shaft 154 which is employed to actuate a sleeve locking eccentric drive mechanism for the wheel element 131. As shown in Figures 10 and 11, particularly, this eccentric drive mechanism includes a spur gear 155 arranged for rotation within a fixed casing 156, the gear 155 being mounted upon the inner end of the shaft 154. Arranged to mesh with the gear 155 is a pair of spur gears 157, which are carried by a pair of eccentric shafts 158, journaled for rotation in the ends of the casing 156. The said casing is provided with a central partition 159, which divides the casing into a gear chamber 160 and an eccentric chamber 161. Fixed upon the shafts 158 within the chamber 161 are eccentrics 162, which are disposed within openings 163 provided in a plurality of rack plates 164. Each of these plates is provided with a centrally disposed opening having rack teeth 165 along the upper and lower surfaces thereof, said rack teeth being arranged rectilinearly and adapted to be alternately engaged with a pinion 166 fixed to a shaft 167 upon which the wheel element is mounted. By this construction, which is employed in most chain hoist constructions, rotation of the eccentrics 162 will cause the plates 164 to move in substantially elliptical orbits in which the rack teeth thereof will be intermittently engaged with the pinion 166, the arrangement of the said plates, however, being such that certain of the rack teeth 165 will be constantly in engagement with the pinion 166, a feature which insures the locking of the wheel element in any given position of rotation. This eccentric drive while powerful and effective is necessarily quite slow, and therefore, a proper speed is secured by providing an enlarged gear 139 and a small pinion 140.

In view of the construction described, it will be manifest that the present invention provides a loading machine having essentially a single prime mover. This construction is desirable in that it eliminates the employment of a large number of motors, controllers and resistance, wiring and other apparatus connected therewith, and reduces the possibility of serious delays resulting from motor troubles in the use of the machine. Motors are constantly a source of trouble in most mining equipment, because of poorly mounted conductors, improperly bonded rails, improper installation, low voltages, absence of proper electrical and mechanical inspection and other very important causes. The present invention aims to reduce this trouble to a minimum by providing a single motor which serves to actuate all of the cooperative units of the machine. Thus a single motor is provided which operates the gathering conveyer, the loading conveyer, the propelling mechanism and the side swinging mechanism and eliminates thereby the two or three additional motors hitherto employed for securing the same results. The shape of the machine lends itself conveniently to the installation of a comparatively large motor, and there is ample space between the forward end of the truck and the bottom of the rear or elevated end of the gathering conveyer frame. In the event that the loading or delivering conveyer is eliminated, the single motor may be employed for driving the propelling, gathering and side swinging mechanisms, or it is within the purview of the invention to operate the side swinging mechanism by an independent motor if such a construction should be desired. I am aware of the patent to Morgan, No. 1,175,166, issued March 14, 1916, and therefore do not claim anything contained in the disclosure of this patent.

In Figure 1, the forward end of the gathering conveyer may be equipped with a pony truck 168 which is employed to facilitate the transportation of the machine and to enable the relatively extended frame of the gathering conveyer to readily negotiate the sharp curves of a mine. This pony truck is so constructed that when the machine is engaged, however, in active gathering operations, the said pony truck may be suspended from the bottom of the frame 2 so as to be out of the way. While I have described what I now consider to be the preferred embodiment of my invention, it will, nevertheless, be understood that the disclosure is in a sense employed for illustrative purposes and that various changes or modifications of a more or less minor character may be made in the actual machine from that herein disclosed and described without departing from the spirit of the invention. I therefore claim all such structures as may be said to fall fairly within the scope of the following claims.

What is claimed is:

1. In a loading machine, a portable base, a gathering conveyer including an elongated inclined frame having its upper elevated end arranged above said base and its front end disposed in advance of said base for horizontal sweep movement across a mine floor, a motor carried by said base beneath the relatively elevated end of said frame, a trunnioned supporting structure between said base and frame admitting of vertical and horizontal oscillation of said frame, a vertical drive shaft for said conveyer arranged axially within said bearing member, a gear driven by said motor and mounted for rotation in a fixed horizontal plane, and a gear fixed to the lower end of said shaft and oscillable in a vertical plane in unison with said frame, said gears being formed to maintain a driving relation throughout the range of vertical adjustment of the frame.

2. In a loading machine, a portable base, a conveyer including an elevated inclined frame having a conveyer belt arranged for movement thereon, a trunnioned supporting structure between the rear or elevated ends of said frame and said base, said structure admitting of the oscillation of said frame about vertical and horizontal axes, a vertical driven shaft passing through said supporting structure and operatively connected with said belt, a motor, a gear element mounted to rotate in a substantially fixed horizontal plane and driven by said motor, and a second gear element mounted upon the lower end of said shaft for oscillation in unison with said shaft and supporting structure and formed to maintain a power imparting relation with said first named gear element throughout the operative range of oscillatory adjustment of the conveyer frame.

3. In a loading machine, a conveyer including an elongated inclined frame, a supporting structure arranged beneath one end of said frame and formed to admit of vertical oscillation thereof, an oscillatory drive shaft for said conveyer journaled in connection with said supporting structure, a power driven gear element fixed for rotation in a substantially horizontal plane, and a second gear element fixed to said shaft and situated in substantially the plane of said first named gear element, said gear elements being formed so as to maintain driving relation throughout the range of vertical adjustment of the frame.

4. In a loading machine, a conveyer including an elongated inclined frame, a supporting structure for said frame arranged beneath the elevated end of the latter and comprising horizontal and vertical axes about which said frame may swing in horizontal and vertical planes, an oscillatory drive shaft for said conveyer journaled in connection with said supporting structure, a motor driven gear element independently mounted with respect to said frame and fixed for rotation in a substantially horizontal plane, and a second gear element fixed to said drive shaft in a plane co-incident with the horizontal axis of the supporting structure and formed for constant engagement with said first gear element irrespective of the positions assumed thereby through the swinging of the conveyer frame.

5. In a loading machine, a conveyer including an elongated inclined frame having a reversible single plane conveyer belt mounted thereon, a supporting structure for said frame disposed at the rear end of the latter and including vertical and horizontal axes about which said frame may swing bodily in horizontal and vertical planes, an oscillatory drive shaft for said conveyer belt journaled in connection with said supporting structure, a gear element mounted independently of said frame and fixed for rotation in a substantially horizontal plane, a second gear element carried by said shaft and disposed co-incidentally with the horizontal axis of said supporting structure and in mesh with the first gear element throughout the operative range of swinging movement of said frame, a drive element carried by the upper end of said shaft for engagement with said belt and a clutch structure cooperative with said drive element for governing the operation of said belt.

6. In a loading machine, an elongated inclined frame, a supporting structure beneath the rear elevated end of said frame, permitting the front end of the frame to swing horizontally, an endless conveyer belt carried by said frame, a wheel element carried by said frame, a flexible cable trained about said wheel element and adapted to have the ends thereof connected with anchors disposed laterally and mounted independently of said frame whereby upon the rotation of said wheel element, said frame will be caused to swing horizontally, and means actuated by power derived from said belt to effect the rotation of said wheel element.

7. In a loading machine, an elongated inclined frame, a supporting structure beneath the rear elevated end of said frame permitting the front end of the latter to swing horizontally, an endless conveyer belt mounted on said frame, means for driving said belt, and means cooperative with said belt when the latter is in motion to swing said frame horizontally.

8. In a loading machine, an elongated inclined frame, a supporting structure for said frame disposed beneath the elevated end thereof and formed to include a substantially vertical axis about which the frame may swing bodily horizontally, a conveyer belt mounted upon said frame, said belt having its going and return runs transversely spaced and disposed at similar elevations, and means situated wholly upon and above said frame and disposed within the confines of said belt to impart lateral swinging motion to the frame.

9. In a loading machine, an elongated inclined frame, a supporting structure for said frame disposed beneath the elongated end thereof and formed to include a substantially vertical axis about which the frame swings bodily horizontally, a conveyer belt mounted upon said frame, said belt having its going and return runs transversely spaced and disposed at similar elevations, and means carried above the bottom of said frame and mounted between the opposite runs of said belt to impart lateral swinging motion to said frame.

10. In a loading machine, an elongated inclined frame, a supporting structure for said frame disposed beneath the elevated end thereof and formed to include a substantially vertical axis about which the frame swings bodily horizontally, a conveyer belt mounted upon said frame, said belt having its going and return runs transversely spaced and disposed at similar elevations, longitudinally extending guides provided upon said frame for the reception of the opposite runs of said belt, and means for imparting lateral swinging movement to said frame mounted above the bottom of said frame and arranged between said guides.

11. In a loading machine, an elongated inclined frame, a supporting structure for said frame disposed beneath the elevated end thereof and formed to include a substantially vertical axis about which the frame may swing bodily horizontally, a conveyer belt mounted upon said frame, said belt having its going and return runs transversely spaced and disposed at similar elevations, and means driven by said belt and situated upon said frame within the confines of said belt to impart lateral swinging motion to the frame.

12. In a loading machine, an elongated inclined frame, a supporting structure for said frame disposed beneath the elevated end of the frame and formed to include a substantially vertically disposed axis about which said frame swings bodily horizontally, a power driven endless conveyer belt carried by said frame, mechanism mounted upon said frame and driven from said belt to swing the frame horizontally, and means for changing at will the direction of operation of said side swinging mechanism independently of the direction of movement of said belt.

13. In a loading machine, an elongated inclined frame, a supporting structure for said frame disposed beneath the elevated end thereof and including a substantially vertical axis about which said frame swings horizontally, a conveyer belt on said frame, said belt having its going and return runs disposed in similar elevations, a sprocket mounted upon said frame and driven by said belt, and means driven from said sprocket to impart positive side swinging movement to the frame.

14. In a loading machine, an elongated inclined frame, a supporting structure for said frame disposed beneath the elevated end thereof and including a substantially vertical axis about which the said frame is adapted to swing horizontally, a conveyer belt on said frame, said belt having its going and return runs disposed at the same elevation, a sprocket mounted upon said frame and driven by said belt, means to impart positive side swinging movement to said frame mounted upon the latter between the runs of said belt, a reversing mechanism between the sprocket and side swinging means to control the direction of operation of the latter independently of the direction of movement of said belt.

15. In a loading machine, an elongated inclined frame, a supporting structure beneath the elevated end of said frame including a vertical axis about which the frame swings bodily horizontally, an endless belt conveyer mounted upon said frame, a sprocket driven by said belt, means mounted upon said frame to impart positive side swinging movement thereto, driving connection between said sprocket and side swinging means, reversing mechanism situated in said connection to control the direction of operation of said side swinging means independently of the direction of movement of said belt, and a clutch between said reversing mechanism and drive sprocket.

16. In a loading machine, in combination, an elongated inclined frame, a supporting structure at the rear end of said frame permitting the latter to swing horizontally, an endless belt conveyer carried by said frame, means for imparting side swinging movement to said frame including a wheel element, and a power actuated, self locking eccentric drive mechanism for effecting the operation of said element.

17. In a loading machine, in combination, an elongated inclined frame, a pivotal mounting for said frame permitting the latter to swing bodily horizontally, an endless belt conveyer mounted upon said frame, means for imparting positive horizontal swinging movement to said frame including a wheel element, a cable trained around said element and adapted to have the ends thereof secured to laterally disposed anchors, whereby upon the rotation of said wheel element said frame will be drawn horizontally, and self locking power driven eccentric drive mechanism for effecting the rotation of said wheel element.

18. In a loading machine, in combination, an elongated inclined frame, a supporting structure disposed at one end of said frame, said supporting structure including a vertical pivot about which said frame swings horizontally, an endless belt conveyer carried by said frame, a drum mounted for rotation upon said frame, a flexible cable trained about said drum and having the ends thereof secured to lateral anchors, whereby upon the rotation of said drum, said frame will be swung horizontally, an eccentric drive mechanism for said drum, and means for operating said drive mechanism from said belt conveyer.

19. In a loading machine, in combination, a gathering conveyer, a delivering conveyer placed in the rear of the gathering conveyer and arranged to receive materials therefrom, a portable base upon which said conveyers are mounted, a reversible motor carried by said base, driving connections between said motor and gathering conveyer, power connections between said motor and delivering conveyer, an automatic clutch mechanism in said last named power connection serving to operate the delivering conveyer in but one direction irrespective of the direction of rotation of said motor, power connections between said motor and the propelling elements of said base, and means in said last named connections serving to rotate said propelling elements in selected directions irrespective of the direction of movement of said motor.

20. In a loading machine, a portable base including propelling elements, a gathering conveyer including an elongated inclined frame, a supporting structure between said base and the elevated end of said frame, an endless conveyer belt carried by said frame, a drive shaft for said belt passing axially through said supporting structure, a motor mounted upon said base, power connections between said motor and said drive shaft, independently operable power connections between said motor and propelling elements, independently operable clutch means for governing the operation of said belt and propelling elements, and means for selectively governing the direction of movement of said belt and propelling elements independently of each other.

21. In a loading machine, a portable base, a gathering conveyer including an elongated inclined frame, a supporting structure between said base and frame permitting the latter to swing horizontally and vertically, an endless belt conveyer mounted upon said frame, a sprocket for driving said conveyer, a drive shaft connected with said sprocket and extending axially through said supporting structure, a motor mounted upon said base, drive connections between said motor and said shaft, a counter-shaft extending at right angles to and driven by said shaft, a delivering conveyer mounted upon said base in the rear of said gathering conveyer, a forward horizontally extending shaft carried by said base and about which said delivering conveyer may swing vertically, a drive shaft for said delivering conveyer located at the rear end of the latter, a sprocket mounted upon the horizontally extending shaft of said delivering conveyer, power connections between said countershaft and said sprocket, and power connections between said sprocket and the drive shaft of said delivering conveyer.

22. In a loading machine, in combination, a supporting base, a gathering conveyer and a delivering conveyer mounted upon said base, a reversible motor mounted upon said base, power connections between said motor and said gathering conveyer, power connections between said motor and delivering conveyer, means automatically operative to drive said delivering conveyer in but one direction irrespective of the direction of rotation of said motor, said gathering conveyer being responsive to the direction of rotation of said motor, a clutch structure for governing the operation of said gathering conveyer, and a clutch structure for governing the operation of the delivering conveyer.

23. In a loading machine, a base, a delivering conveyer mounted upon said base and including an elongated frame, a endless belt conveyer passing through said frame, a foot shaft disposed at the forward end of said frame and mounted in connection with said base, said foot shaft serving to provide a horizontal axis about which said frame swings in a vertical plane, a sprocket mounted upon said foot shaft, power driven means for imparting motion to said sprocket, a drive shaft for said conveyer located at the rear or delivering end thereof, a second sprocket rotatable with said first named sprocket, and a chain connection between said last named sprocket and said drive shaft, operating to permit of the driving of said conveyer from a point on said foot shaft.

24. In a loading machine, a gathering conveyer including an endless belt having its going and return runs disposed at similar elevations, a sprocket disposed at one end of said belt for driving the latter, laterally projecting flight arms carried by said belt, a loading conveyer disposed at the rear of the gathering conveyer and formed to include a hopper having side walls, said walls having cut-away portions formed at the forward corners thereof to accommodate the rear end of said gathering conveyer, and movable closures arranged to cover the cut-away portions of said hopper and provide guards for preventing coal flung centrifugally from said gathering conveyer from being scattered beyond the confines of the machine.

25. In a loading machine, a portable supporting base, a gathering conveyer including an elongated inclined frame, a supporting structure between said frame and said base permitting the frame to swing in horizontal and vertical planes, an endless belt conveyer carried by said frame having its going and return runs disposed at similar elevations, laterally projecting flight arms carried by said belt, a drive sprocket situated at one end of said belt, and around which said flights travel in a circular path, a delivering conveyer arranged beneath the discharge end of said gathering conveyer and comprising a hopper for receiving material discharged from said gathering conveyer, an endless belt for leading material out of said hopper, a mounting for said hopper permitting the same to swing horizontally, the forward corners of said hopper being cut away to accommodate the rear end of said gathering conveyer, whereby the said two conveyers may swing horizontally to assume relatively angular positions, and removable closures arranged to occupy said cut-away portions in said hopper to direct coal thrown centrifugally from the gathering conveyer into engagement with the belt of the delivering conveyer.

26. In a loading machine, progressively arranged gathering and delivering conveyers, said gathering conveyer comprising a single plane conveyer belt, laterally projecting flight arms carried by said belt, a drive sprocket around which said belt passes at the discharge end of said gathering conveyer, a hopper forming a part of said delivering conveyer, an endless belt leading out of the base of said hopper, and removable sides provided in connection with said hopper and positioned to direct materials flung centrifugally from the discharge end of the gathering conveyer belt into the interior of said hopper.

In testimony whereof I have signed my name to this specification.

NORTON A. NEWDICK.